United States Patent
Lindsay et al.

(10) Patent No.: US 7,025,157 B2
(45) Date of Patent: Apr. 11, 2006

(54) PALLET TRUCK TILLER ARM WITH ANGLE DETECTOR FOR SPEED SELECT

(75) Inventors: Ryan Philip Lindsay, Moline, IL (US); Verle W. Dau, Davenport, IA (US); Alan W. Bartels, Wilton, IA (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 10/626,981

(22) Filed: Jul. 25, 2003

(65) Prior Publication Data

US 2005/0016779 A1    Jan. 27, 2005

(51) Int. Cl.
*B62D 51/04* (2006.01)

(52) U.S. Cl. ............... 180/19.2; 180/19.1; 180/332

(58) Field of Classification Search ...... 180/19.1–19.3, 180/65.1, 65.8, 315, 332, 333; 200/6 B, 200/6 BA, 6 BB, 6 R
See application file for complete search history.

(56) References Cited

U.S. PATENT DOCUMENTS

| | | | |
|---|---|---|---|
| 3,179,198 A * | 4/1965 | Hastings, Jr. ............... | 180/65.1 |
| 3,724,586 A | 4/1973 | Goodacre | |
| 3,757,180 A | 9/1973 | Subler | |
| 3,791,474 A | 2/1974 | Stammen et al. | |
| 3,809,833 A * | 5/1974 | Miller et al. ............... | 200/61.27 |
| 3,950,681 A | 4/1976 | Kern | |
| 4,287,959 A | 9/1981 | Inman | |
| 4,444,248 A * | 4/1984 | Hirosuke .................... | 165/120 |
| 4,691,148 A * | 9/1987 | Nicholls et al. ............. | 318/12 |
| 4,716,980 A | 1/1988 | Butler | |
| 5,245,144 A | 9/1993 | Stammen | |
| 5,964,313 A | 10/1999 | Guy | |
| 6,227,320 B1 * | 5/2001 | Eggert et al. .............. | 180/19.2 |
| 6,464,025 B1 | 10/2002 | Koeper et al. | |
| 6,491,122 B1 | 12/2002 | Leitner et al. | |
| 6,595,306 B1 * | 7/2003 | Trego et al. ............... | 180/19.2 |
| 6,776,249 B1 * | 8/2004 | Fortin ....................... | 180/19.3 |

FOREIGN PATENT DOCUMENTS

| | | |
|---|---|---|
| EP | 0 812 798 B1 | 9/1997 |
| EP | 1 264 759 B1 | 8/2001 |
| EP | 1 125 819 B1 | 9/2001 |

\* cited by examiner

*Primary Examiner*—Lesley D. Morris
*Assistant Examiner*—L. Lum
(74) *Attorney, Agent, or Firm*—Terri S. Flynn; Quarles & Brady LLP

(57) ABSTRACT

A motorized pallet truck includes an angular indicator on the steering arm mechanism providing an internal controller with an angular position of the steering arm or tiller. The controller applies a brake when the tiller is in either of a substantially vertical or substantially horizontal position, limits the speed of the truck for a predetermined rotational movement from the vertical position, and allows full speed of the vehicle when the tiller arm is pulled into a predefined fast driving arc.

23 Claims, 9 Drawing Sheets

PALLET TRUCK TILLER ARM WITH ANGLE DETECTOR FOR SPEED SELECT

FIELD OF THE INVENTION

The present invention relates to material handling vehicles and, more particularly, to a material handling vehicle which is steered with a steering tongue or tiller arm including an angle detector for limiting the speed of the vehicle based on the angle of the tiller arm.

BACKGROUND OF THE INVENTION

Industrial material handling vehicles such as fork lift trucks or motorized hand pallet trucks are commonly found in warehouses, factories, shipping yards, and, generally, wherever pallets, packages, or loads of goods are required to be moved from place to place. Pallet trucks typically include a load bearing fork or lift arm for lifting packages or pallets to a height sufficient for transporting, an electric drive motor for driving the vehicles, a steering control mechanism, and a brake. These vehicles can include an operator station, on which the operator stands as the pallet truck moves, or can be designed for the operator to walk behind the vehicle at the end opposite the forks.

The steering mechanism for a common type of pallet truck includes a movable arm or tiller and a control handle mounted at the end of the tiller. The tiller is rotatable right and left to steer the vehicle, while a rotatable thumb wheel or twist grips on the handle control the speed and direction of the truck, selecting between a forward and a reverse direction. To prevent movement of the truck when the operator has left the vehicle, the steering tiller arm is typically spring loaded. When the tiller is released, it is forced by the spring to a near vertical position outside of a defined operating arc. In the vertical position, a spring-applied "deadman" brake mechanism is automatically activated to prevent further motion of the vehicle.

To activate the deadman brake quickly and to limit use of the vehicle when the tiller is in a near vertical position where the mechanical advantage for steering is typically poor and the potential speed of the vehicle is nonetheless relatively high, prior art material handling vehicles were constructed to require the tiller arm to be moved a relatively large angle from the vertical position prior to releasing the brake. The steering arm or tiller therefore had to be pulled a significant distance toward the horizontal before operation of the vehicle was allowed. Limiting operation in this way, however, poses problems for pallet trucks used in narrow lanes and, in an increasingly common mode of operation, inside of trailers and other large containers for moving goods. In these applications, the horizontal space available for swinging the tiller to the right and left within the operating arc is limited, and it can therefore be difficult to steer the vehicle when the tiller is pulled too far from the vertical position. In such applications, it is therefore desirable to allow the vehicle to be controlled with the tiller in a nearly vertical position.

One solution to this problem has been to provide switches in conjunction with the steering tiller which are activated to indicate a transition to a first angle at which a slow mode is entered and a second angle at which a fast mode is entered. In these prior art devices, the pallet truck transitions to a slow mode in which the maximum speed of the vehicle is restricted whenever the first switch is activated, and to a fast mode whenever the second switch is activated, irrespective of the position of the other switch. While typically providing the appropriate functions, these prior art devices suffer from a number of disadvantages. Specifically, when using this type of switching system, it is possible to identify only three driving states, even though two braking states, a fast, and a slow mode are required. Furthermore, as state changes occur irrespective of the position of the other switch, it is difficult to determine when a failure has occurred, or to adequately monitor changes in driving states.

SUMMARY OF THE INVENTION

In one aspect, the present invention provides a material handling vehicle comprising a drive system, a brake coupled to the drive system to prevent motion of the material handling vehicle, and a steering mechanism for selecting a direction of motion. The steering mechanism is moveable along an arc between a substantially horizontal position and a substantially vertical position. An angular position indicator is activated by the steering mechanism as the steering mechanism is rotated, and provides a control signal indicating the angle of rotation of the steering mechanism. A controller receives the control signal and selectively places the pallet truck in one of a plurality of successive driving states based on the angle of rotation. The driving states typically include a top (vertical) brake mode, a slow speed mode, a fast mode, and a bottom (horizontal) brake mode.

In another aspect, the present invention provides pallet truck in which the steering mechanism includes a cammed surface which selectively activates a switching device to produce a control signal indicating at least a first, a second, and a third angle of rotation of the steering mechanism. A controller receives the control signal and changes a driving state of the pallet truck progressively from a top braking mode, to a slow speed mode, to a fast speed mode, to a bottom braking mode as the steering mechanism is rotated from the vertical to the horizontal position. During the transitions, the controller monitors the changes to determine whether a valid transition has occurred and activates the brake if the transition is invalid.

In yet another aspect, the present invention provides a pallet truck including first and second switching devices which are each selectively activated by the steering mechanism as the steering mechanism is rotated in a vertical plane to produce a two bit state code, the two bit state code providing four possible sequential driving states. A controller is electrically connected to switching devices, receives the two bit state code, compares the two bit code to the present driving state code, determines if the transition to the state represented by the two bit code is a sequential transition, and enters an error mode if the transition is not sequential. If the transition is sequential, the controller transitions to the driving state represented by the two bit code.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
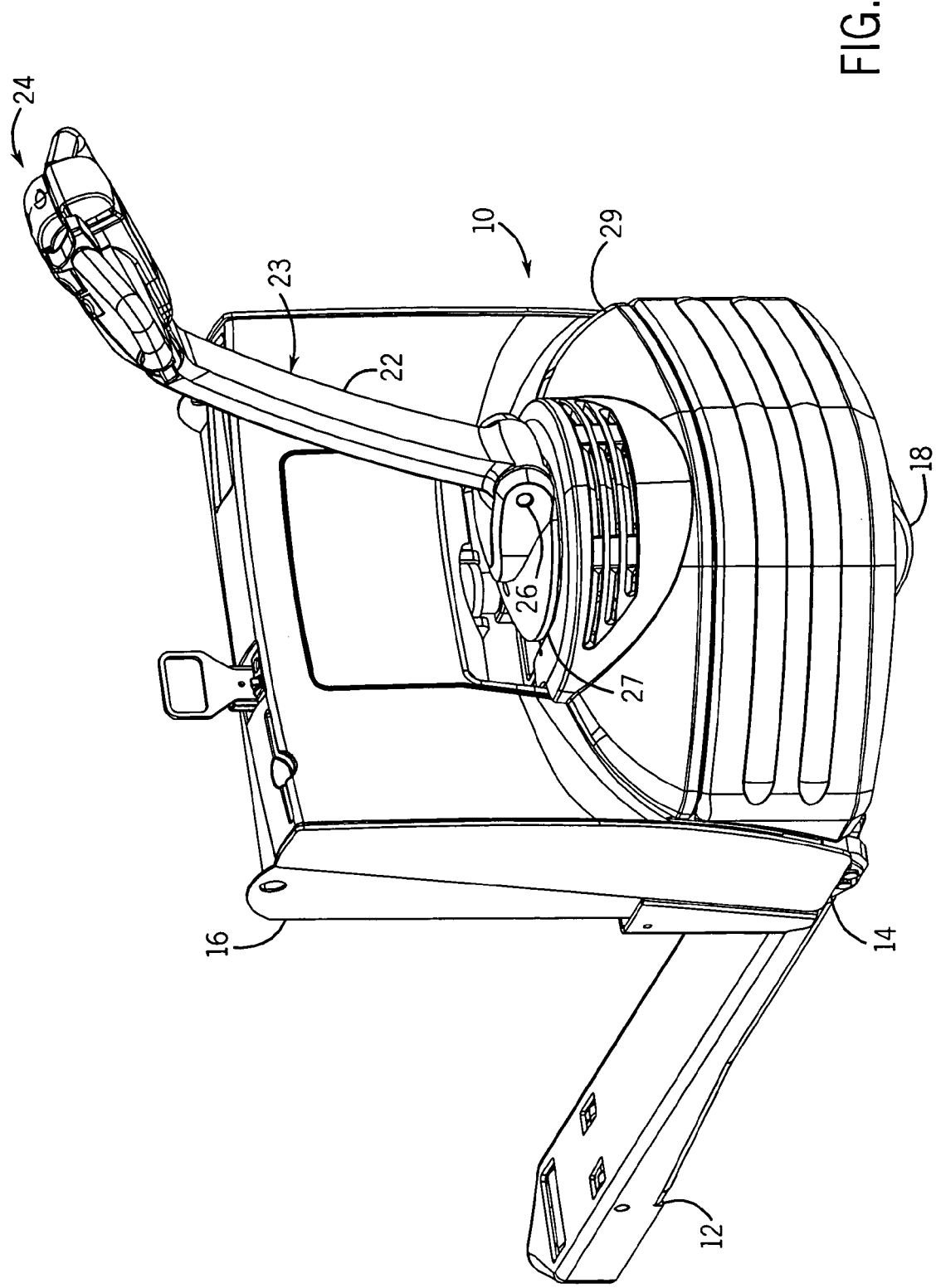
FIG. 1 is a perspective view of a pallet truck.

Referring now to the figures and more particularly to FIG. 1, a pallet truck 10 constructed in accordance with the present invention is shown. The pallet truck 10 comprises forwardly extending forks 12, a drive motor (FIG. 9) provided in a motor compartment 14, a battery (FIG. 9) provided in battery compartment 16, and a steered wheel 18. The steered wheel 18 is coupled to a steering mechanism 23 which includes both a tiller arm 22 and an operator control handle 24. The steering mechanism 23 is rotatable to the right and left to change the direction of the pallet truck 10 and is further movable in an arc between a substantially vertical position and a substantially horizontal position. When in either of the substantially horizontal position or the substantially vertical positions, a deadman brake 84 (FIG. 9) is activated, as described below. To assure that the truck 10 is stopped when the operator leaves the vehicle, the steering mechanism 23 is spring loaded such that it is forced into a vertical position when released.

Figure 2:
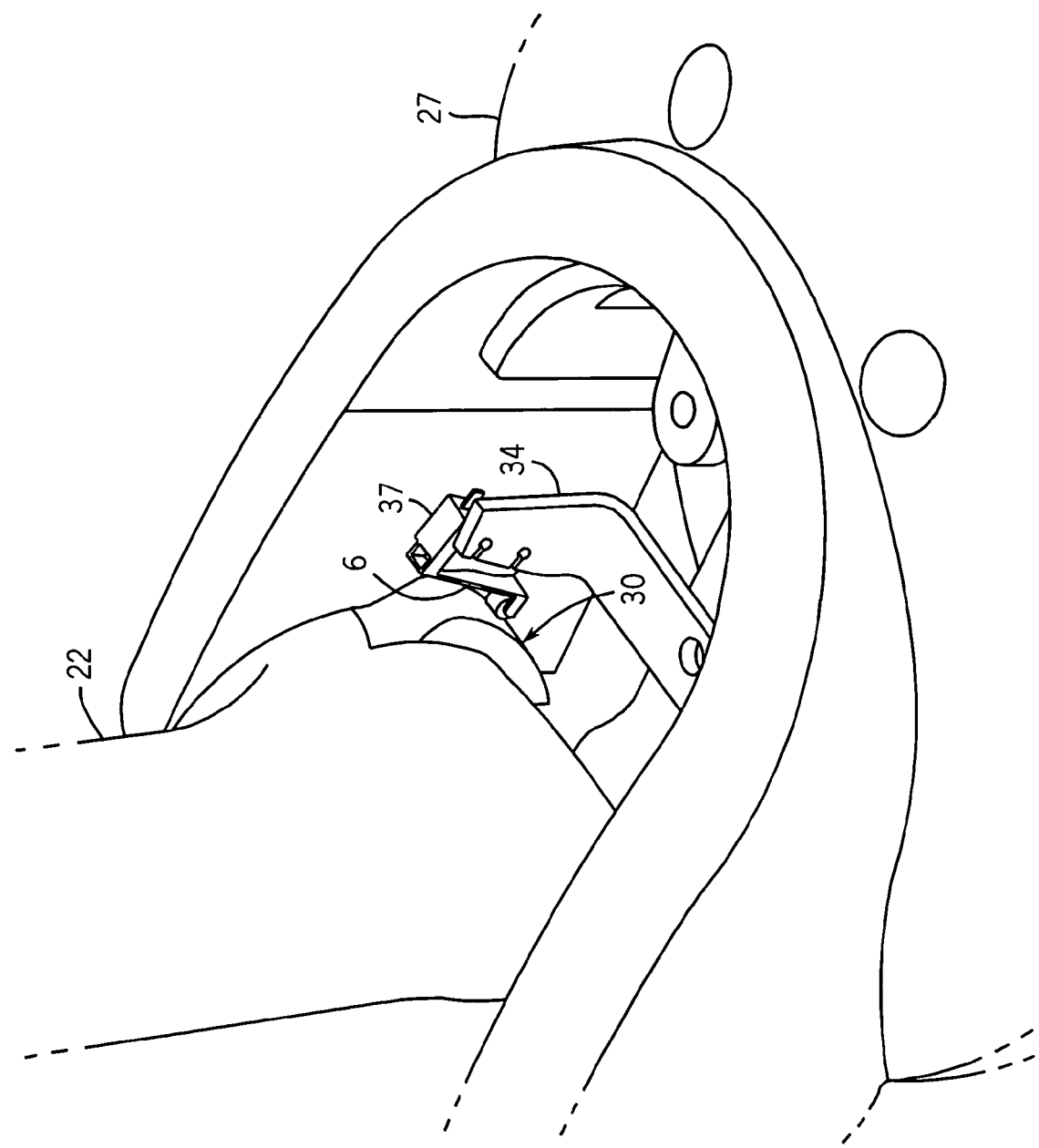
FIG. 2 is a perspective showing the details of a steering handle for a hand/rider truck.
Figure 3:
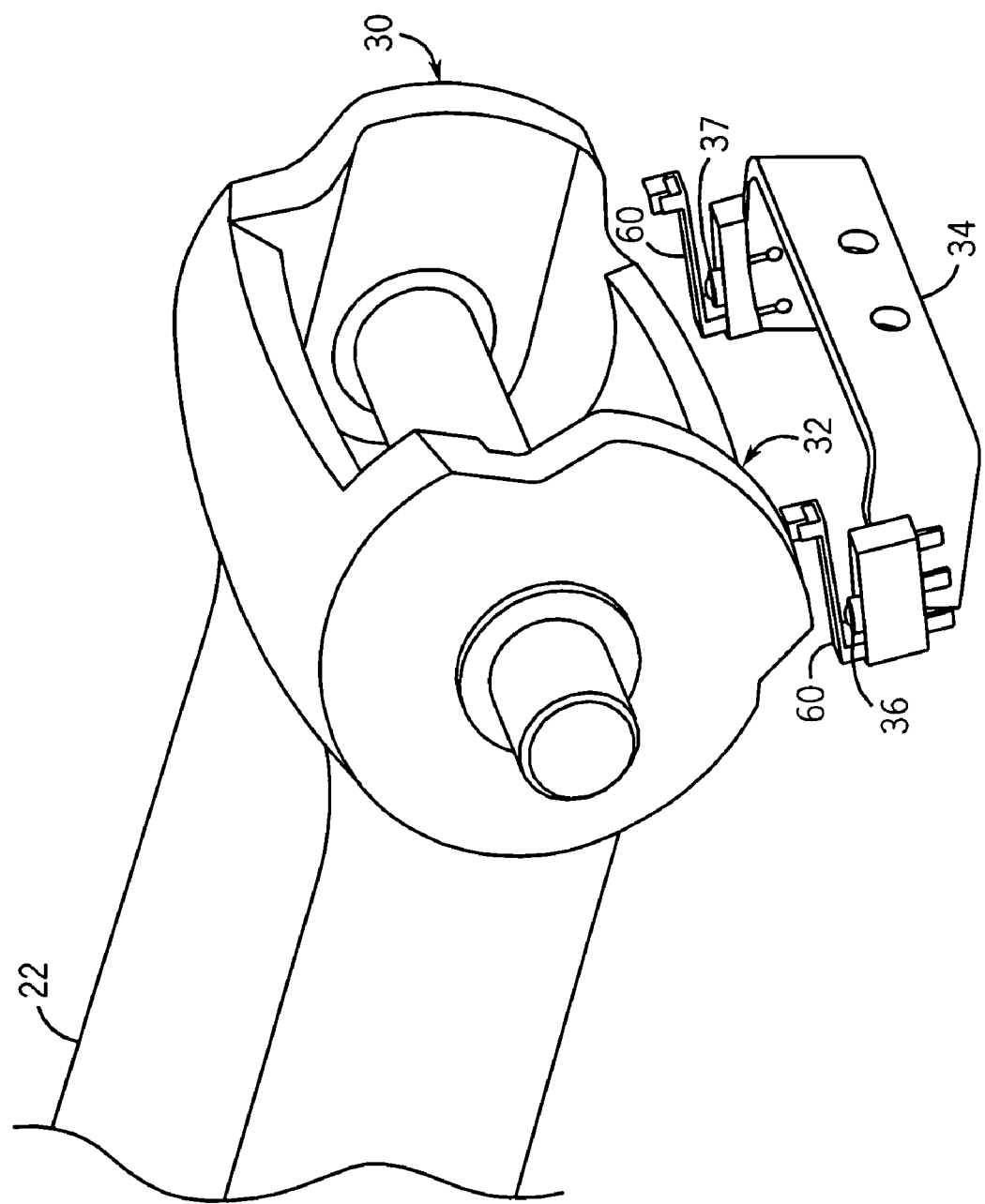
FIG. 3 is an exploded view of the tiller arm and associated switches.
Figure 4:
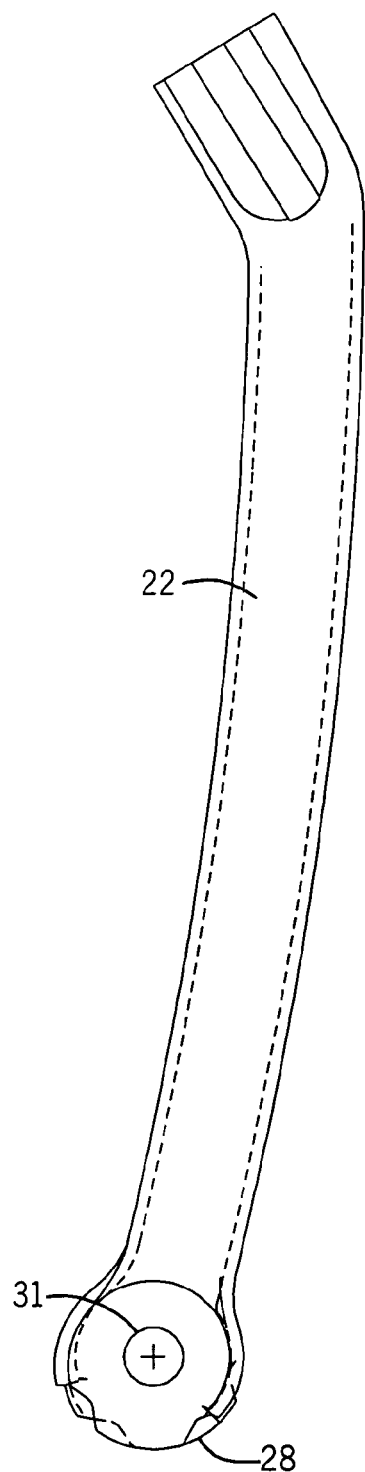
FIG. 4 is a side view of the tiller arm of FIG. 1.
Figure 12:
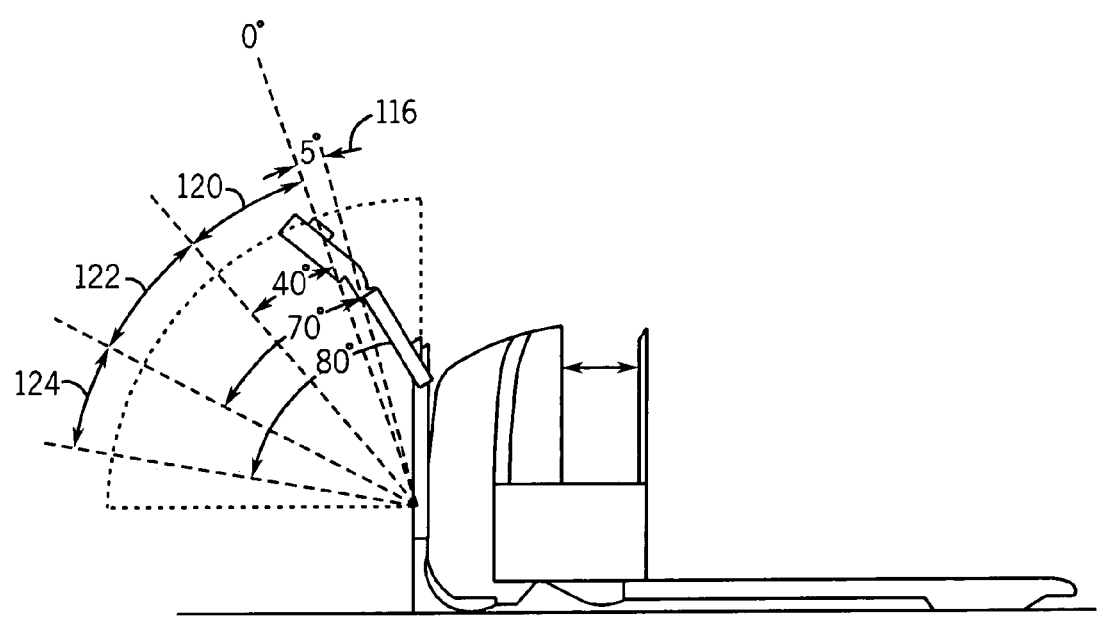
FIG. 12 is a side view of the pallet truck of FIG. 1 illustrating a driving arc of the tiller arm and associated angles for changing driving states.

Referring now to FIGS. 1 and 2, the tiller arm 22 is pivotally mounted to a swiveling mount 27, which is coupled to the transmission, including steered wheel 18, of the pallet truck 10. The tiller arm 22 can swivel the swiveling mount 27 to the right and left, thereby allowing the operator to change the direction of the lift truck 10 by moving the steered wheel 18. The tiller arm 22 is further pivotable around a pivoting axis 26, and is moveable through a "driving arc" extending from a substantially horizontal to a substantially vertical position around this axis, as shown in FIG. 12. Referring now also to FIGS. 3 and 4, a bottom distal end 28 of the tiller arm 22 is mounted adjacent a frame member 34 mounting first and second switches 36 and 37. The surface of the tiller arm 22 at the distal end 28 is cammed to selectively activate the switches 36 and 37 as the tiller arm 22 is rotated about the pivot point 26 to provide an indication of the angle of rotation and to switch between driving states, as described below. Each of the cammed surfaces 30 and 32 are positioned adjacent a lever arm 60 with a roller activator for activating the respective switch. Although a number of lever and roller activated switches are available, one switch useful in the present invention is the V4N snap-action series of microswitches commercially available from Saia-Burgess USA of Vandalia, Ohio.

Figure 5:
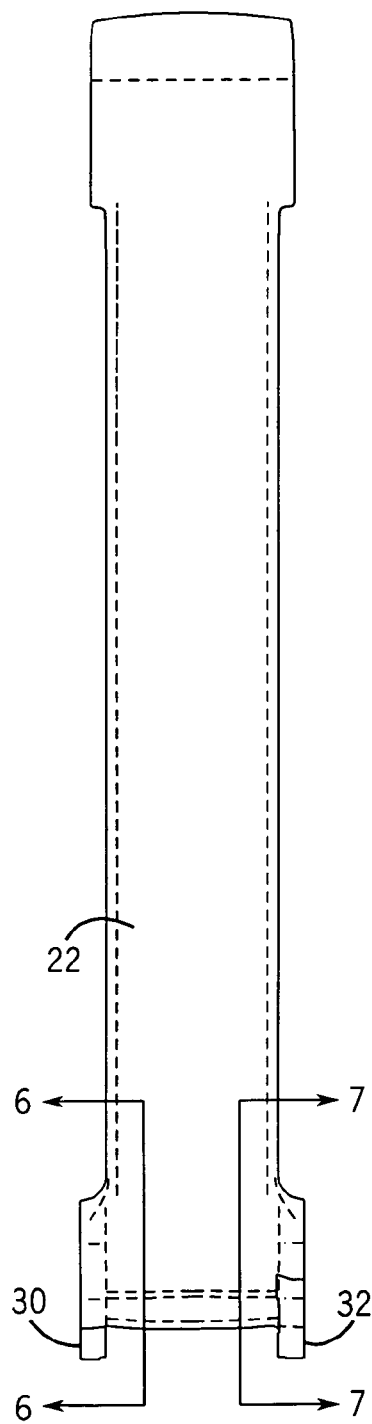
FIG. 5 is a back view of the tiller arm of FIG. 4.

Referring now to FIG. 4, the tiller arm 22 includes an aperture 31 for receiving a shaft for rotating the arm 22 around the axis 26. At the bottom distal end 28 of the tiller arm 22 adjacent the aperture 31 the tiller arm 22 is generally cylindrical in shape, but, as described above, includes a cammed surface for activating the switch. Referring now also to FIG. 5 the bottom surface of the distal end 28 of the tiller arm 22 includes a first cammed surface 30 provided along a first side of the tiller arm 22 and a second cammed surface 32 provided along the opposing side of the tiller arm 22. The cammed surfaces 30 and 32 are sized and dimensioned to selectively activate and deactivate the adjacent switches 36 and 37 (FIGS. 2 and 3) at selected angles, as the tiller arm 22 is moved between a horizontal and a vertical mechanical stop point (not shown) providing a substantially horizontal and a substantially vertical tiller arm 22 position. The ON/OFF state of the switches are monitored by the control system (FIG. 9) of the pallet truck 10 to switch between four modes of operation or driving states as indicated by a two bit code developed by the switches (37/36), as follows: a top brake mode (0/0), a bottom brake mode (1/0), a slow mode (0/1), and a fast mode (1/1), as described below. The cammed surfaces 30 and 32 are configured to turn the switches 36 and 37 off in the default top brake mode (0/0), the most likely failure mode for the switches. The fast mode is assigned to the (1/1) state, the least likely failure state. Failures in the switching devices 36 and 37 are identified by evaluating the sequencing through the drive states, as described below.

Figure 6:
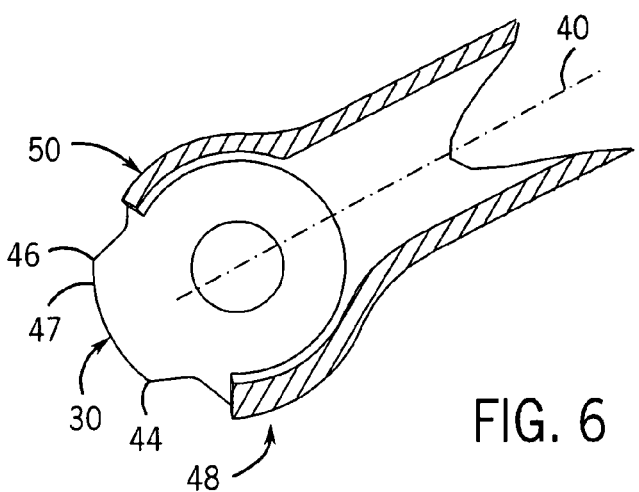
FIG. 6 is a cutaway view of the tiller arm of FIG. 5 taken along line 6—6.

Referring now to FIG. 6 a sectional view of the tiller arm 22 taken along the line 6—6 of FIG. 5 is shown, illustrating the cammed surface 30. The cammed surface 30 extends from a vertical mechanical stop (not shown) at end 50 (a substantially vertical tiller position) on a front side of the tiller arm 22 to a horizontal mechanical stop (not shown) at end 48 (a substantially horizontal tiller position) on the back side of the tiller arm 22. From the vertical mechanical stop, the camming surface 30 extends inward toward the vertical center line 40 at a radius selected to prevent actuation of the associated switch, and ramps upward at transition point 46 to a radius 47 selected to activate the switch 37. The camming surface 30 follows the radius 47 to a second transition 44 at which the radius is reduced to deactivate the switch. The radius 47 therefore provides a portion of the camming surface 30 during which the switch 37 is active.

Figure 7:
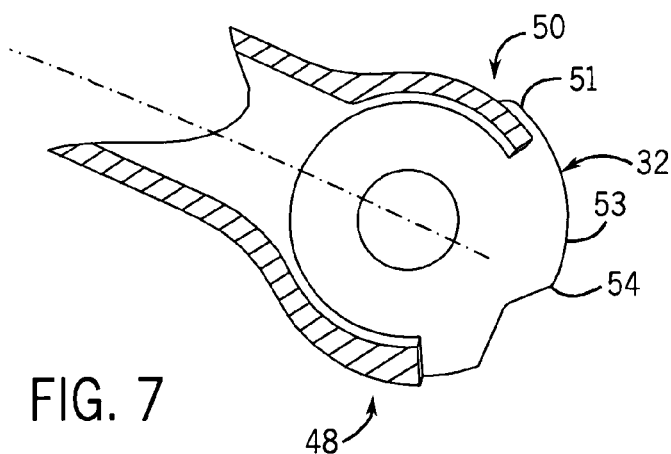
FIG. 7 is a cutaway view of the tiller arm of FIG. 5 taken along the line 7—7.

Referring now to FIG. 7 a sectional view of the tiller arm 22 taken along the line 7—7 of FIG. 5 is shown, illustrating the cammed surface 32. Like the cammed surface 30, the cammed surface 32 extends between the horizontal mechanical stop at end 48 and the vertical mechanical stop at end 50. From end 48 the cammed surface extends toward the vertical center line 40 at a radius selected to prevent activation of the switch, and then ramps upward to a transition point 54. From the transition point 54 to an opposing transition point 51, the cammed surface 32 follows a radius 53 selected to activate the associated switch 36.

Figure 8:
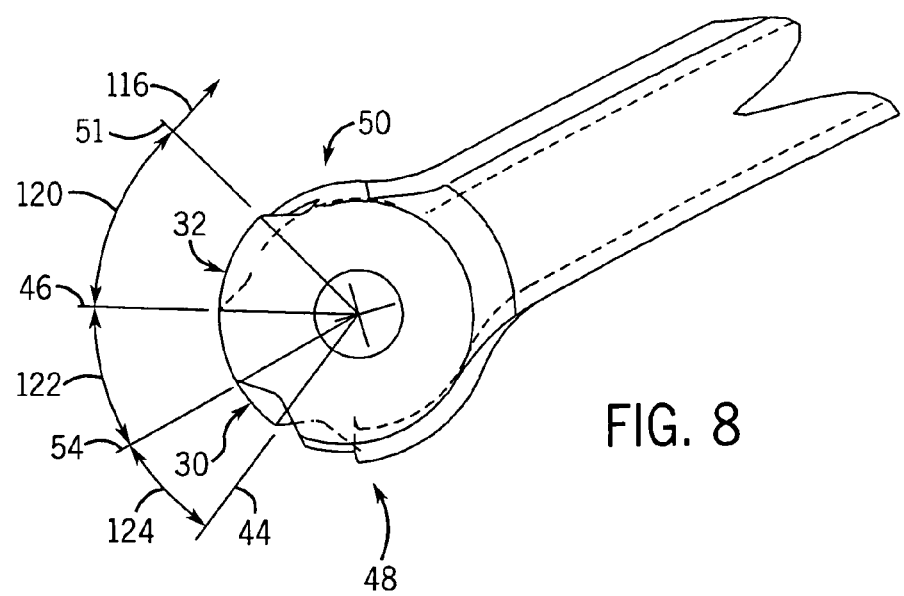
FIG. 8 is an exploded view of the tiller arm and associated cam surfaces.

Referring now to FIG. 8 a side view of the tiller arm 22 illustrating the aligned cammed surfaces 30 and 32 is shown. Extending from the first end 50, each of the cammed surfaces 30 and 32 maintains the associated switch 37 and 36, respectively, in an off position, providing the top brake mode 116. At transition point 51, the cammed surface 32 activates the switch 36, and the slow speed mode 120 is entered. The slow speed mode 120 continues until the transition point 46, at which the cammed surface 30 activates the switch 37 to enter the fast mode 122. The fast mode 122 continues until transition point 54, at which the cammed surface 32 deactivates the switch 36 to enter the bottom brake mode 124. The cammed surfaces 30 and 32 therefore act together to provide an indication of changes in angular position of the tiller, which are then associated with driving states of the vehicle.

Figure 9:
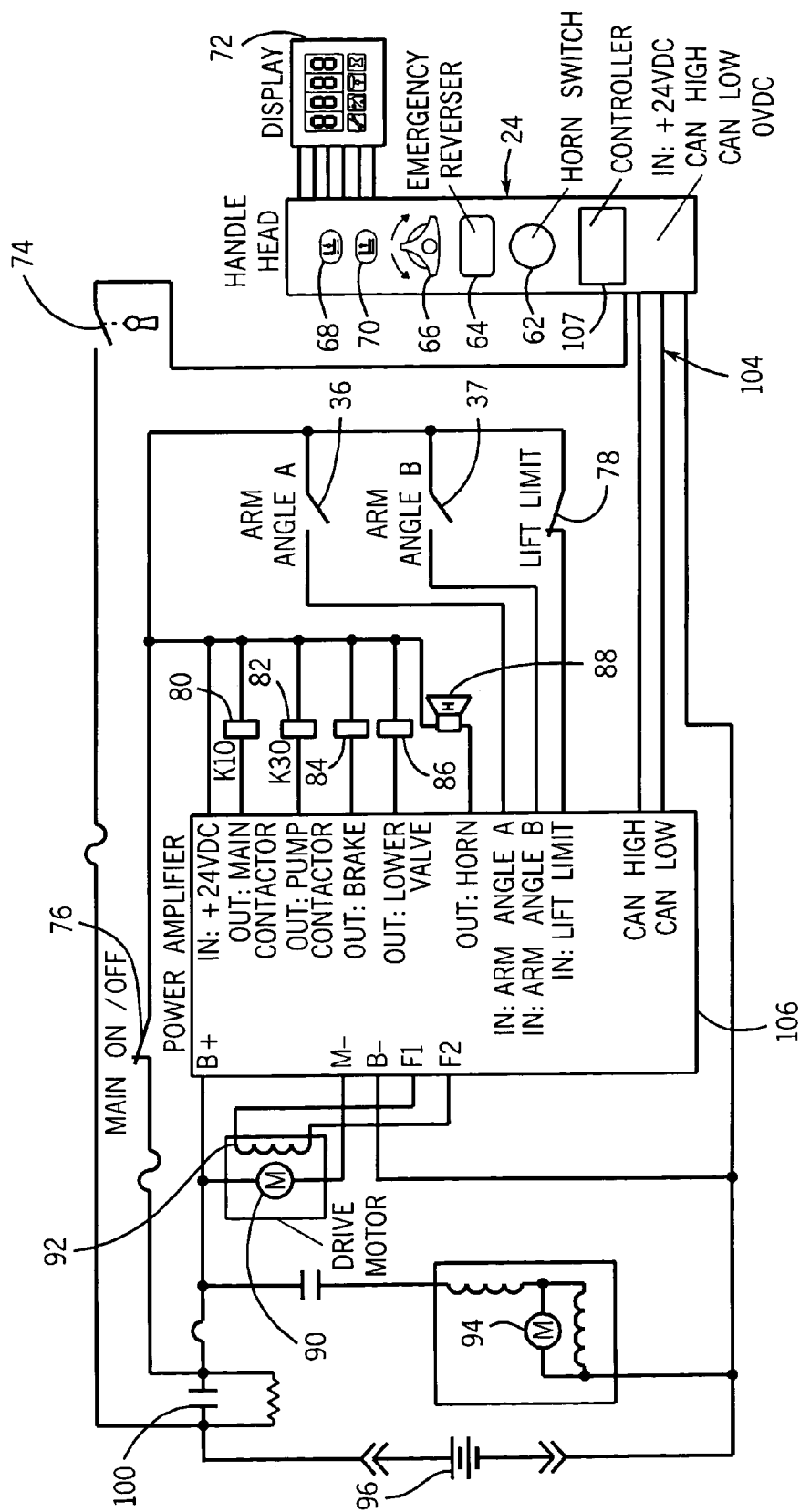
FIG. 9 is a block diagram of the control circuit of the pallet truck of FIG. 1.

Referring now to FIG. 9 a block diagram of a control system of the pallet truck 10 of the present invention is shown. Power is applied to the pallet truck 10 by activation of a main on/off switch 76 and a key switch 74, which activates the control handle 24. The control system comprises a controller 106 which receives input control signals from each of the switches 36 and 37, as well as from the control handle 24 via a CAN (controller area network) bus 104. The control handle 24 includes a controller 107 connected to the CAN bus, as well as switches and activators providing lift 70 and lower 68 controls for the fork 12 (FIG. 1), an emergency reverse button 64, a horn switch 62 for activating the horn 88, and a display 72 which can provide information such as battery state of charge, hour meter, or other operational information, as well as error information, as described below. The control handle 24 further includes a directional and speed control, preferably in the form of a thumbwheel or twist grip 66, which is selectively activated by an operator in a first direction to provide a control signal for motion in the forks first direction and in a second direction to provide a control signal for motion in the forks trailing direction. Based on the received inputs, the controller 106 activates a horn 88, a lift motor solenoid 82, a fork lowering valve solenoid 86, a deadman brake coil 84, and a main control contactor 80. The controller 106 further controls an electrical drive mode 90 by applying a selected voltage across field coils 92, as described below.

The key switch 74 is activated to apply power to the control handle 24, putting the pallet truck 10 into an operational mode. Once the key switch 74 is activated, the operator can provide directional and functional control information to the pallet truck 10 through the controls on the control handle 24, as described above. Upon a power request, the controller 106 pulls in the main contactor solenoid 80, closing normally open contact 100, and therefore allowing power to be applied to the circuit from the battery 96.

Figure 10:
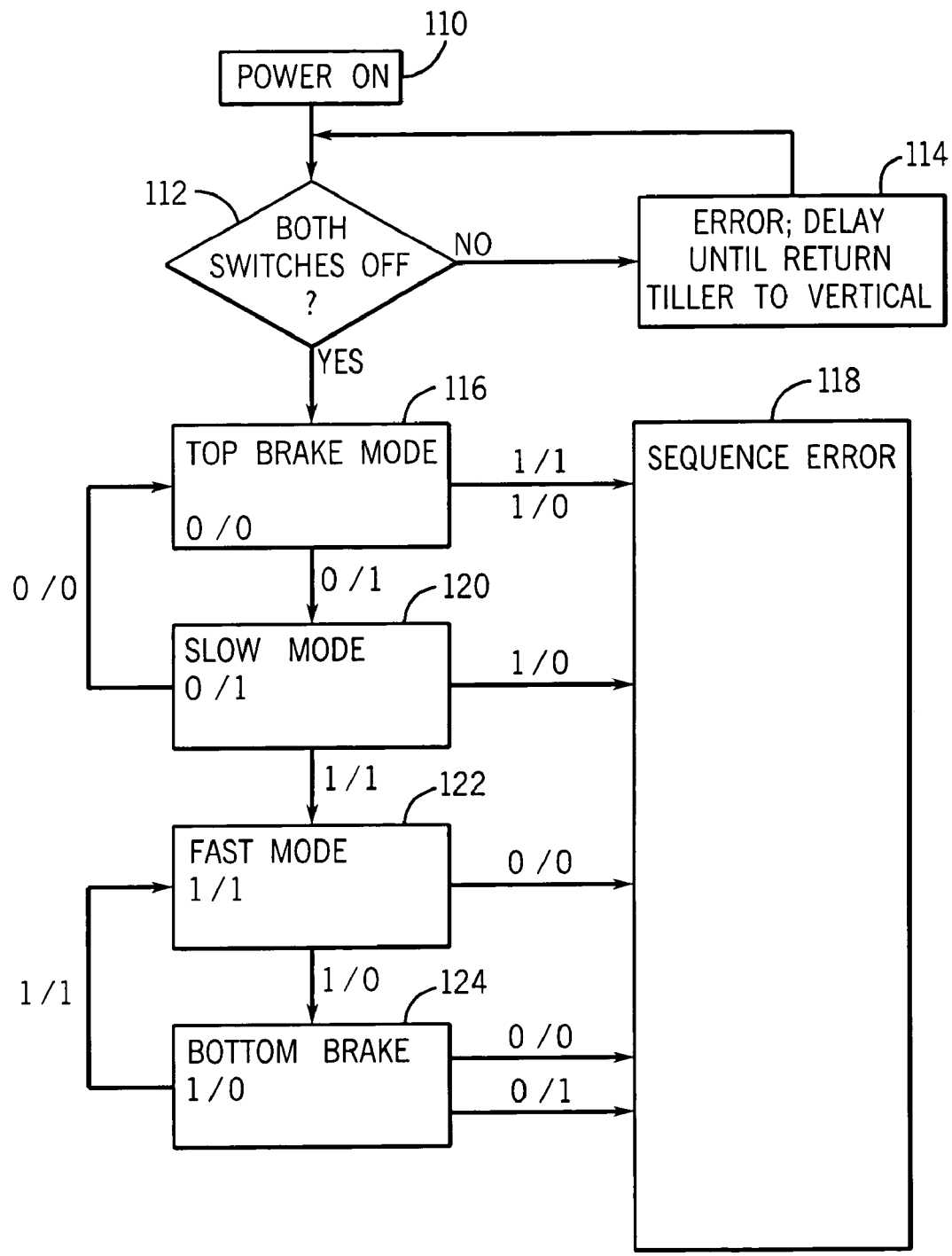
FIG. 10 is a flow chart illustrating transitions between driving states as provided by the control circuit of FIG. 9.

Referring now to FIG. 10, in operation, controller 106 monitors input signals from each of the control switches 36 and 37 and, based on the states of these switches, allows drive. Initially, upon activation of the key switch 74 (step 110), the controller 106 monitors both the switches 36 and 37 to determine whether both switches 36 and 37 are off (step 112), and the truck 10 is therefore in the top brake mode 116. If not, the controller keeps the brake applied 84 and provides an error message on the display 72. The controller 106 then goes into a delay mode preventing further action by the truck 10 until the tiller arm 22 is returned to the vertical position (114) and re-enters the top brake mode (116).

Referring now to FIGS. 9 and 10, when both switches 36 and 37 are off, the pallet truck 10 enters the top brake state 116. From the top brake mode 116, the controller 106 monitors the states of the switches 36 and 37. As described above, during operation the cammed surfaces 30 and 32 assure that, barring a failure, state transitions occur in a given order, specifically from top brake 116 (0/0), to slow mode (0/1) 120, to fast mode (1/1) 122, to bottom brake (1/0) 124, as the tiller arm 22 is moved from the substantially vertical to the substantially horizontal position in the driving arc. From the default top brake mode 116, for example, the pallet truck 10 must next enter the slow state 120 as indicated by the transition of the switch 36 from an off condition to an on condition. If, however, the switches 36 and 37 indicate a transition from the top brake mode 116 to the fast mode 122 or the bottom brake mode 124, the controller 106 determines that an invalid transition has been made, and the controller 106 enters a sequence error state 118, applies the brake 84, and provides a sequence fault error message on the display 72.

As described above, when each of the switches 36 and 37 is off, the truck 10 is in the top brake state 116 and the controller 106 deactivates the brake 84 by removing the voltage directly across the brake coil 84, preventing motion of the pallet truck 10. When the switch 36 is on and the switch 37 is off, the controller 106 determines whether the previous state was the top brake state 116, as expected. If the transition state is correct, the tiller arm 22 has moved out of the vertical position but is still at a relatively high angle, and the controller 106 allows a transition to the slow mode 120. In the slow mode, the controller limits the maximum speed of the pallet truck 10 to approximately one mile per hour. Therefore, speed signals received from the hand grips 66 on the control handle 24 and transmitted to the controller 106 through the CAN bus 104 are scaled by the controller 106 to limit the speed of the pallet truck 10 to the pre-selected maximum speed, and an appropriate voltage is applied across the field coils 92 to drive the drive motor 90 at the selected speed.

From the slow mode 120, if the switch 37 is activated, the tiller arm 22 has been rotated to a position closer to horizontal in which steering is easier, and the controller 106 allows operation of the pallet truck 10 in a fast mode 122. Here, the controller 106 allows the pallet truck 10 to travel up to a predetermined maximum speed, typically 3.5 miles per hour. Again, the controller 106 scales the input signals received from the CAN bus 104 and applies a voltage across the field coil 92 to drive the motor 90 at the selected speed. From the slow mode 120, the tiller arm 22 can also be rotated back toward a vertical position, deactivating the switch 36 and returning the pallet truck 10 to the top brake mode 116. Other transitions result in a sequence error 118.

From the fast mode 122, deactivation of the switch 36 indicates that the tiller arm 22 has been moved to a near horizontal position, resulting in a transition to the bottom brake mode 124, wherein the controller 106 applies the brake 84. Deactivation of the switch 37, on the other hand, indicates that the tiller arm 22 has been moved toward the vertical, resulting in a transition to the slow mode 120. From the bottom brake state 124, the tiller arm 22 can only be moved toward the vertical, resulting in an actuation of the switch 36 and entry into the fast mode 122. Any other transition results in a sequence error 118.

As described above, if the controller 106 determines at any time that a transition from one driving state to another driving state is incorrect, a sequence error 118 has occurred and the controller 106 applies the brake 84 and provides an error message on the display 72 through the CAN bus 104, as described above. Typically, the error is caused by a failure of one of the switches 36 and 37, and can be rectified with maintenance.

Figure 11:
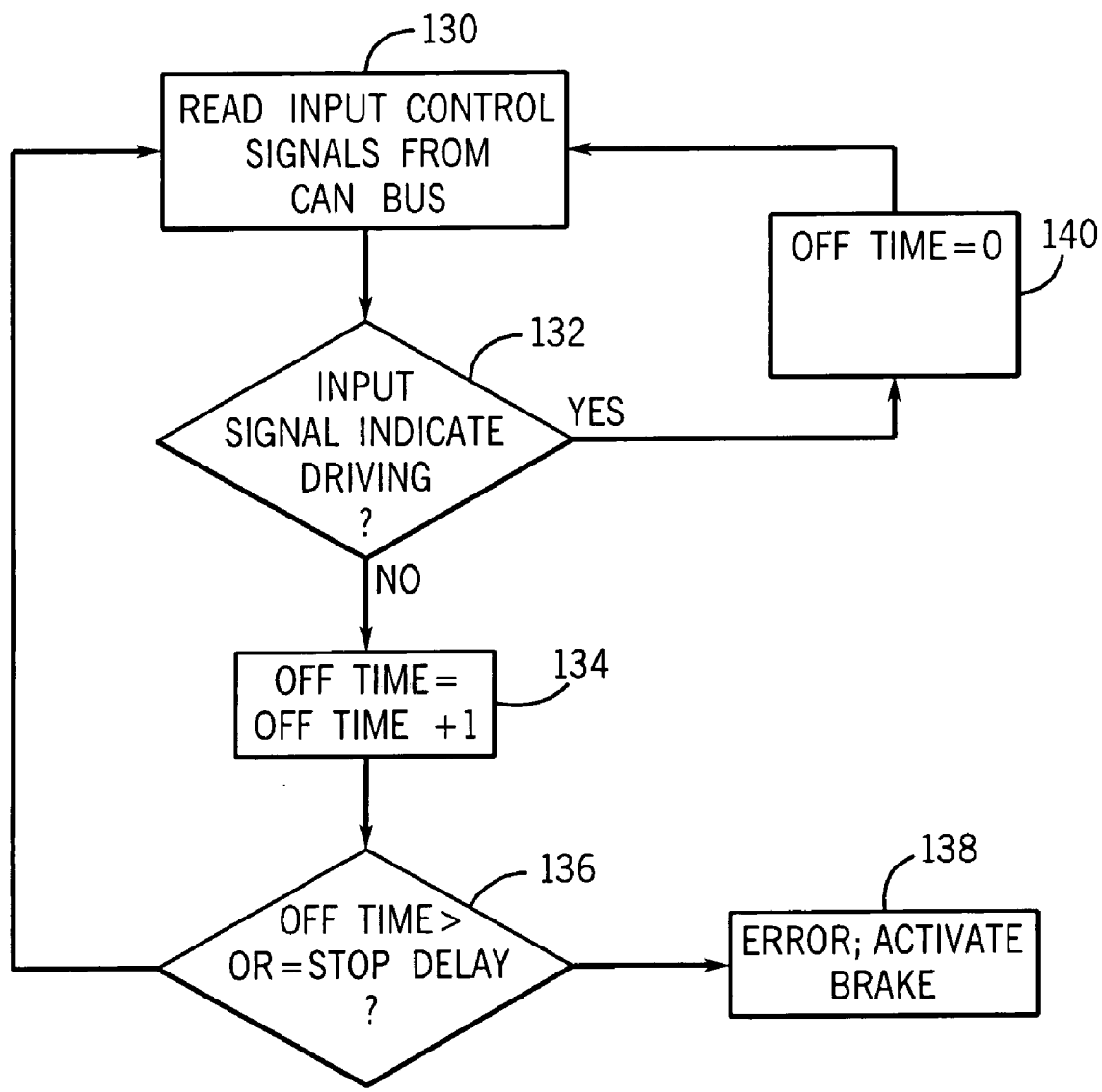
FIG. 11 is a flow chart illustrating an error check for returning the pallet truck to a braked state when stopped.

Referring now to FIG. 11, during operation, the controller 107 also continually monitors the input control signals from the CAN bus 104 (step 130) to determine if the pallet truck 10 is still active or has stopped. The controller monitors the driving status (step 132) and, if no driving occurs, the controller 107 increments a counter calculating the amount of time the pallet truck has been inactive or off (step 134), and compares the off time to a predetermined stop time (step 136) selected empirically as representative of an unmanned vehicle. If the off time is greater than or equal to the predetermined stop time, the controller 107 determines that the pallet truck 10 is unmanned, and checks switches 36 and 37 to verify that the tiller arm 22 has been returned to the vertical position. If the truck 10 is unmanned and the tiller arm 22 has not returned to the top brake mode 116, the controller 107 enters a static return to off error mode (step 130), applies the brake 84, and provides an error message on the display 72. As the tiller arm is spring-loaded it should return to the top brake mode 116 automatically, and failure to do so could be caused by a mechanical problem by the associated spring or other component. If driving occurs, the controller 107 re-sets the off time to zero (step 140).

Referring now to FIG. 12, a side view of the pallet truck 10 illustrating the preferred angles for switching between driving states is shown. As described above, the tiller arm 22 is movable up and down through a driving arc that ranges from a nearly horizontal position to a substantially vertical position, and is spring loaded to drive the steering arm 22 to a default position in the substantially vertical position. In a preferred embodiment of the invention, the tiller arm 22 is moveable between mechanical stops provided at angles of −5 degrees and 80 degrees, as measured versus a line drawn through the center of the tiller arm 22 to the control handle 24. The cammed surfaces 30 and 32 are positioned to provide angle indications for switching the operation of the vehicle between the bottom (horizontal) brake position 124, a fast speed mode 122, the slow speed mode 120, and the top (vertical) brake mode 116, as described above.

Starting from the vertical mechanical stop at −5 degrees, each of the switches 36 and 37 are maintained in an off position until the tiller arm 22 is rotated to an angle of approximately zero degrees. As the tiller arm 22 is rotated toward the horizontal position to an angle greater than zero degrees, the cammed surface 32 activates the switch 36, and the pallet truck 10 enters the slow mode 120 of operation in which the maximum speed of the pallet truck is limited, preferably to a speed of approximately one mile per hour. As the tiller arm 22 continues to rotate to an angle of about forty degrees, the switch 37 is activated by cammed surface 30, and the controller 106 transitions the pallet truck 10 from the slow mode 120 of operation to the fast mode 122 of operation. Here, the limitation of the speed of the vehicle is dropped, and the controller 106 allows the pallet truck to drive up to the maximum speed, which is approximately 3.5 miles per hour. As the tiller arm 22 continues to rotate downward to an angle of about 70 degrees, the switch 36 is deactivated and the bottom brake 124 state is entered in which the controller 106 again applies the brake 84. Finally, at 80 degrees a mechanical down stop is reached.

Although preferred switching angles and speed levels have been described, the cammed surfaces 30 and 32 can be configured to provide switching at any number of angles. Furthermore, although specific speed levels have been described, it will be apparent that variations can be made to the selected speed levels without exceeding the scope of the invention. Additionally, although a specific type of switch has been described, it will be apparent that various switches and other types of actuators could also be used. Furthermore, other methods of determining an angle of rotation of a steering mechanism and providing a control signal will be known to those of skill in the art.

Furthermore, although the invention has been described for use with a four state control system, it will be apparent that the principled of the invention could be applied to provide various driving functions at various additional angles. For example, a pallet truck could be constructed to include a plurality of different speed ranges as the steering mechanism is rotated, as well as one or more stop position.

Additionally, although the invention has been described with reference to a pallet truck, the principles described could also be applied to various other types of material handling vehicles.

The invention has been described in detail with particular reference to certain preferred embodiments thereof, but it will be understood that variations and modifications can be effected within the spirit and scope of the invention.

We claim:

1. A material handling vehicle, comprising:
   a drive system controlled by the operator to drive the material handling vehicle in a selected direction;
   a steering mechanism coupled to the drive system and controlled by the operator to select a direction of motion, the steering mechanism being moveable along an arc between a substantially horizontal position and a substantially vertical position;
   a brake coupled to the drive system to prevent motion of the material handling vehicle;
   an angular position indicator activated by the steering mechanism as the steering mechanism is moved along said arc and providing a control signal comprising at least two bits, the control signal indicating an angle of movement of the steering mechanism; and
   a controller for receiving the control signal and for selectively placing the material handling vehicle in one of a plurality of successive driving states based on the angle of movement of the steering mechanism, and wherein the controller verifies that a transition between successive driving states is a valid transition based on the previous driving state of the material handling vehicle as the steering mechanism is moved, and applies the brake if the transition is not a valid transition.

2. The material handling vehicle of claim 1 wherein the driving states include at least a top braking mode, a slow speed mode, a fast speed mode, and a bottom braking mode.

3. The material handling vehicle as defined in claim 2, wherein the controller limits the speed of the material handling vehicle to approximately one mile per hour when the material handling vehicle is in the slow speed mode.

4. The material handling vehicle as defined in claim 2, wherein the controller limits the speed of the material handling vehicle to approximately three and one half miles per hour when the material handling vehicle is in the fast speed mode.

5. The material handling vehicle as defined in claim 2, further comprising an operator control for selecting a speed of the vehicle, wherein the controller scales the speed received from the operator control based on a predetermined maximum when the material handling vehicle is in the slow speed mode.

6. The material handling vehicle as defined in claim 2, wherein the controller transitions the driving state from the braking mode to the slow mode to the fast mode and back to the braking mode as the steering mechanism is moved between a substantially vertical and a substantially horizontal position.

7. The material handling vehicle as defined in claim 1, wherein at least two of the driving states are braking states and the controller applies the brake in the braking states.

8. The material handling vehicle as defined in claim 1, wherein the angular position indicator comprises first and second switches.

9. The material handling vehicle as defined in claim 8, wherein a first angle is indicated by activation of the first switch, a second angle is indicated by activation of the second switch, and a third angle is indicated by deactivation of the first switch.

10. The material handling vehicle as defined in claim 9, wherein the braking mode is activated at a first angle as the steering mechanism is rotated toward the vertical and at a second angle as the steering mechanism is rotated toward the horizontal.

11. The material handling vehicle as defined in claim 8, wherein the steering mechanism includes a cammed surface for selectively activating and deactivating each of the first and second switches as the steering mechanism is moved along the arc.

12. The material handling vehicle as defined in claim 1, wherein the controller further monitors the operator control for a delay in driving and, when no driving occurs for a period of time greater than a selected time period, applies the brake.

13. The material handling vehicle as defined in claim 1, wherein the driving states include at least one braking mode and a plurality of speed modes.

14. A pallet truck, comprising:
a steering mechanism moveable in an arc between a substantially horizontal and a substantially vertical position;
a drive system coupled to the steering mechanism to drive the pallet truck in a selected direction;
a brake coupled to the drive system to prevent motion of the pallet truck;
a first switching device, the switching device being activated by the steering mechanism as the steering mechanism is moved to produce a first binary control signal;
a second switching device activated by the steering mechanism as the steering mechanism is moved to produce a second binary control signal, the first and second switching devices together producing a two bit state code, the two bit state code providing four possible sequential driving states; and
a controller electrically connected to the first and second switching devices to receive the two bit state code, wherein the controller compares the two bit code to a present driving state code, determines if a transition is a sequential transition, applies the brake if the transition is not sequential, and enters the driving state represented by the two bit code if the transition is sequential.

15. The pallet truck as defined in claim 14, wherein the four driving states are a vertical braking mode, a slow speed mode, a fast speed mode, and a horizontal braking mode.

16. The pallet truck as defined in claim 14, wherein the pallet truck further comprises an operator control for selecting a speed of the pallet truck and wherein the controller further evaluates control signals from the operator control to determine whether the pallet truck has stopped.

17. The pallet truck as defined in claim 16, wherein the controller determines that the pallet truck is inactive when no control signals are received from the switching devices or the operator control for a selected time period.

18. The pallet truck as defined in claim 17, wherein the controller applies the brake when the pallet truck is inactive.

19. The pallet truck as defined in claim 14, wherein the steering mechanism comprises first and second cammed surfaces for activating the first and second switching devices, respectively.

20. The pallet truck as defined in claim 14, wherein the controller applies the brake in the vertical and horizontal braking modes, enables motion within a high speed range in the fast mode, and enables motion within a low speed range in the slow speed mode.

21. A material handling vehicle, comprising:
a drive system controlled by the operator to drive the material handling vehicle in a selected direction;
a steering mechanism coupled to the drive system and controlled by the operator to select a direction of motion, the steering mechanism being moveable along an arc;
an operator control for selecting a speed of the vehicle;
a brake coupled to the drive system to prevent motion of the material handling vehicle;
an angular position indicator activated by the steering mechanism as the steering mechanism is moved along said arc and providing a control signal indicating the angle of movement of the steering mechanism; and
a controller for receiving the control signal and for selectively placing the material handling vehicle in one of a plurality of successive driving states based on the angle of movement of the steering mechanism and for monitoring at least one of the operator control and the drive system for a delay in driving and, when no driving occurs for a period of time greater than a selected time period, applying the brake.

22. The pallet truck as defined in claim 21, wherein the controller further monitors the changes in driving states to determine whether a transition between states is valid and applies the brake if an error has occurred.

23. The pallet truck as defined in claim 21, wherein the controller further monitors the variable speed control device and applies the brake if no speed request is received from the variable speed control device over a selected period of time.

* * * * *